June 19, 1956  L. JOHNSTON ET AL  2,750,880
TICKET ISSUING MACHINE
Original Filed April 20, 1948  10 Sheets-Sheet 1

FIG. 1

INVENTORS.
LEITH JOHNSTON
EDWIN G. COULOMBE JR.
BY *W. Walter Owen*
ATTY.

FIG.4

June 19, 1956  L. JOHNSTON ET AL  2,750,880
TICKET ISSUING MACHINE

Original Filed April 20, 1948  10 Sheets-Sheet 8

INVENTORS.
LEITH JOHNSTON
EDWIN C. COULOMBE JR.
BY
ATTY.

United States Patent Office 2,750,880
Patented June 19, 1956

2,750,880

TICKET ISSUING MACHINE

Leith Johnston, Chicago, and Edwin C. Coulombe, Jr., Elgin, Ill., assignors to Automatic Electric Laboratories, Inc., Chicago, Ill., a corporation of Delaware Original application April 20, 1948, Serial No. 22,144, now Patent No. 2,691,342, dated October 12, 1954. Divided and this application January 15, 1953, Serial No. 331,448

10 Claims. (Cl. 101—66)

This invention relates in general to ticket issuing machines and more particularly to a ticket issuing machine in which automatic supervision of ticket feeding is employed. This application is a division of the co-pending application of L. Johnston and E. C. Coulombe filed April 20, 1948, and bearing Serial No. 22,144, now Patent 2,691,342, granted October 12, 1954.

The ticket issuing machine employed herein to illustrate one method of utilizing this invention is an electrically controlled ticket issuing machine of the type used in a race track totalisator system. This machine prints, counts, cuts off, and ejects the tickets one at a time, in response to the operation of any one of a plurality of electrical push keys which form a part of the machine. The ticket paper is stored in the machine, in the form of a large roll of special paper having the pool data preprinted thereon, preferably along the outer edges, leaving the central portion blank. The data to be printed on the tickets by the machine comprise the runner number, the race number, the track name, the denomination of the ticket, the date, and a secret code name or number, ordinarily changed just before each event as a precaution against forgeries. The runner numbers are on a rotatable type wheel, electrically controlled from the keys, while the race numbers are on a similar wheel mounted on the same shaft, and electrically controlled from the totalisator control room. The date and code word are changeable by hand after the machine has been unlocked and opened, by an authorized person. The ticket paper is taken off the roll, fed thru the machine and the data printed thereon, the tickets then being cut-off and deposited in an exit chute. The ticket paper is passed thru the machine between the roll and the exit chute in a paper guide.

One object of this invention is to provide supervisory means automatically operable responsive to trouble conditions at various points along the paper feed path.

Another object of this invention is to provide supervisory means automatically operable responsive to trouble conditions at various points along the paper feed path and operable to indicate at which one of several points the trouble has been encountered.

Another object of this invention is to provide supervisory means automatically operable responsive to trouble conditions at various points along the paper feed path to indicate the condition, to stop the machine, and to prevent subsequent re-operation in the usual manner of the machine.

Still another object of this invention is to provide supervisory means automatically operable responsive to trouble conditions at various points along the paper feed path to indicate the condition, to stop the machine and to prevent subsequent re-operation of the machine until the trouble condition is cleared if the trouble condition occurs at certain points along the paper path but permits subsequent re-operation of the machine while the trouble condition still exists if the trouble condition occurs at certain other points along the paper path.

Other objects and features of the invention will be apparent from the description and claims which follow, when considered in conjunction with the appended drawings comprising Figures 1 to 26 inclusive, which show one embodiment of the invention, Figure 1 being the overall assembly, while Figures 2 to 24 show the printing unit, and Figures 25 and 26 the circuit.

Figure 11 is an end view of the pawl and ratchet clutch used for driving the main cam shaft, shown in the normal position, while

Figure 13 is a side view of the paper-feed cam shaft as seen from the right-side of the printing unit, while Figures 14 to 18 inclusive, show the individual cams mounted on this shaft, in outline, as seen from the right end of the shaft, while in normal position.

Figure 19 shows the runner-wheel stopping mechanism, in a detached view as seen from the left side of the machine, with all intervening equipment removed.

Finally, Figure 25 shows the circuit of the printing unit, while

Figure 1:
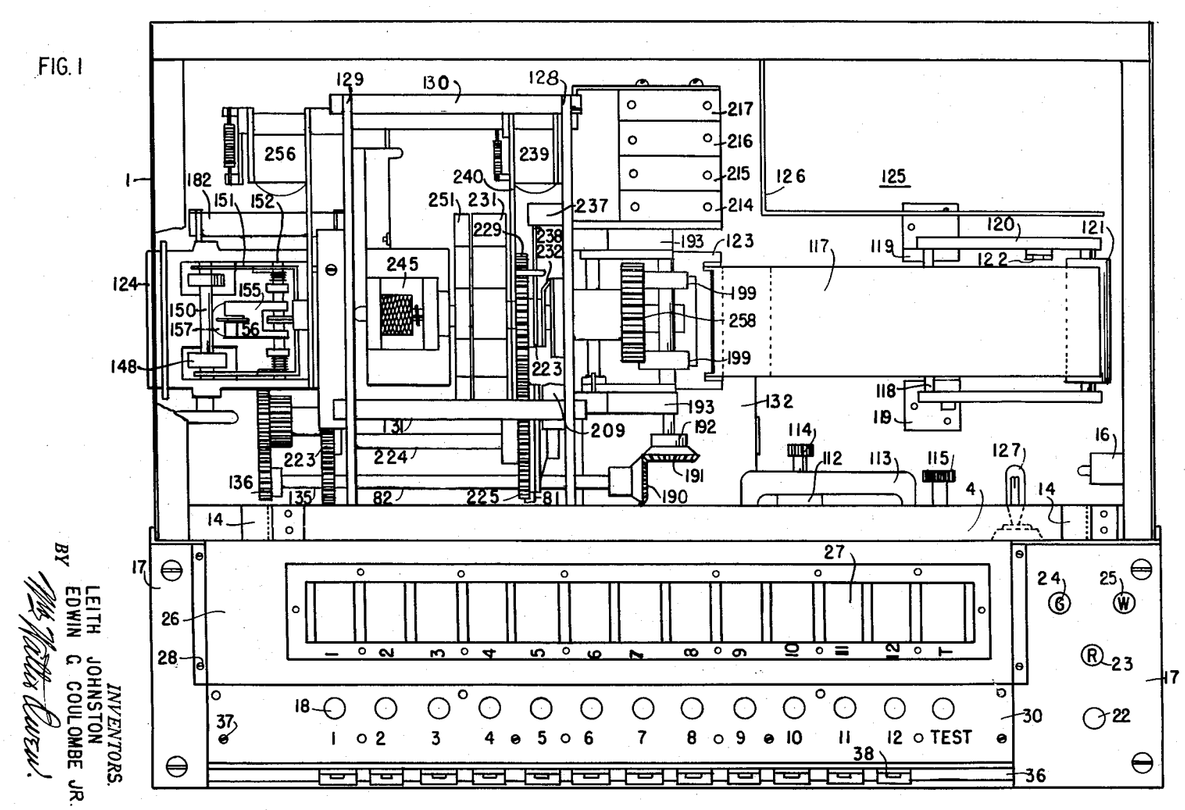
Figure 1 is a plan view of the complete machine with the top cover removed.

At the right of the printing unit in Figure 1, is a roll of ticket paper 117 rotatably mounted on a spindle 118 held loosely in transverse slots cut in the top end of support brackets 119 mounted on the bottom of the box. Pivotally mounted on the bottom end of the brackets 119 are a pair of side brackets 120 carrying at their outward extremity a roller 121, spring-pressed by springs not shown against the under side of the roll of ticket paper. As the roll is used up, the roller 121 rises gradually until, when the paper is almost exhausted, a wired contact 122 carried by the bracket 120 strikes the grounded upright 119 and closes electrical circuits to prevent further operation of the machine, in a manner to be described later, and to light the paper check lamp 23. The paper is fed into the printing unit through the entrance chute 123, while the printed tickets are ejected through an exit or ticket chute 124.

To the rear of the paper reel 117, in the rear part of the housing, is a storage compartment 125 surrounded by a wall 126 which provides space adequate for storing two extra rolls of ticket paper. In front of the paper reel 117 is a lamp 127 mounted on the wall 4, which lights whenever the trouble key 22 is operated, to illuminate the inside of the machine, which may then be seen through the window 6 in the cover.

With reference to the construction of the printing unit, this device is mounted on two flat walls 128 and 129 running from front to rear in parallel planes, and held together by spacer posts, such as indicated at 130 and 131 (Fig. 1). A motor 132 mounted on the right side of the wall 128 at the bottom front corner is arranged by means of a pinion 133 and a gear 134 (Fig. 2), to drive a main shaft 135 mounted in suitable bearings in the walls 128 and 129. A pinion 136, on the far end of this shaft, beyond the wall 129, is similarly arranged to drive a gear 137, which in turn, is arranged to drive a gear 139, through the pinion 138.

Figure 5:
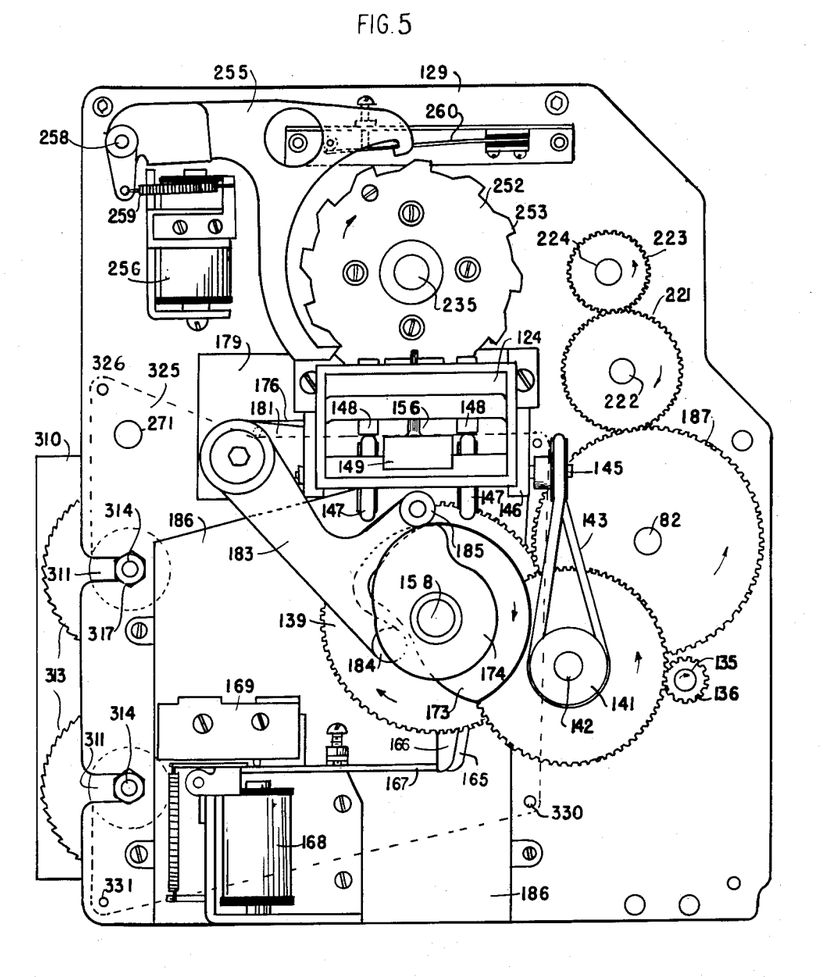

The gear wheel 137 is also rigidly secured to a hollow shaft 140 carrying a small pulley 141, the complete assembly rotatably mounted on a fixed shaft 142 anchored, at its inner end, in the wall 129. The pulley 141 in turn, is arranged to drive, by means of a belt 143, a second pulley 144, rigidly secured to a shaft 145, rotatably mounted just below the ticket chute 124, in side lugs 146 which form a part of the chute. Also rigidly secured to the shaft 145 are a pair of rubber-shod feed rollers 147 (Fig. 5) projecting upward into the inside of the chute through openings on the bottom thereof, to meet a pair of idler rollers 148 projecting downwardly through other openings in the roof of the chute. Thus, when the motor is operating, and there is no ticket in the chute, the rollers 147 will drive the idler rollers 148 without effect, but when a ticket has been fed forward onto the bed 149 of the chute following the printing operation and is cut off, the rollers 147 eject the ticket from the chute, while the motor is coasting to a stop, at the end of the operating cycle.

The ticket-chute idler rollers 148 are mounted on a shaft 150 held between the tips of the long legs of a pair of U shaped brackets 151 (Figs. 1 and 3), each having a long and a short leg, the short legs being adjacent each other to form a central bearing for a pivotal shaft 152 rigidly secured to side lugs 153 on the upper side of the ticket chute. The rollers 148 are pressed in a downward direction by coiled springs 154 on the shaft 152 on either side, one end of which bears down on the long arm of each bracket 151.

Also mounted on the pivotal shaft 152, in the center thereof, is a small rectangular block 155 made of insulating material, and carrying rigidly secured in a slot cut in the free end thereof, a wired flexible contact brush or wiper 156, which projects downward through an opening 157 (Fig. 1) in the top of the chute, to make contact with the grounded bed of the chute. A slot in the pivoted end of the block 155 provides clearance for the entry of the short legs of the U brackets 151. A slight clearance is provided between the ends of these short legs and the bottom of the slot, so as to permit a slight up and down movement of either the brush 156 or the idler rollers 148 independently of each other. A large movement of either member however, will cause a corresponding movement of the other. Normally, since the brush carrier 155 fits somewhat loosely on the rod 152, the brush 156 bears against the bottom of the chute by the force of gravity alone, in the illustrated embodiment, although light spring tension could be readily applied to the block 155 if desired.

The brush 156 is connected in series with a cam controlled contact on the printing unit which is closed only momentarily during the operating cycle of the machine, while the ticket is being fed forward into the chute, just before it is cut off. If at that instant, the ticket is between the brush 156 and the bed of the chute as it should be, nothing happens, but if it is not, the brush completes an electrical circuit which prevents further operation of the machine, in a manner to be described later in connection with the circuits. Similarly, any paper jam in the chute which raises the brush 156 considerably above the thickness of a ticket will ground the brush 156 against the left end of the slot 157, again locking up the machine. The brush 156 is held in the block 155 from the side by means of a set screw, and is thus readily adjustable.

The main driving gear 139, which is freely rotatable about the main drive shaft 158, is arranged to drive a number of cam shafts and a runner-number type-wheel by means of a pawl and ratches clutch controlled by an electromagnet. Accordingly, a toothed drum or ratchet 159 is rigidly secured to the gear 139 and revolves with it. Next to the ratchet 159 to the right thereof on the shaft 158 is a circular plate 160 (Figs. 6, 11 and 12) which is rigidly secured to the shaft and to another gear wheel 161. Also mounted on the plate 160, on the left face, is a pawl 162 pivoted at 163, whose nose is spring pressed toward the ratchet 159 by a coiled spring 164.

Figure 11:
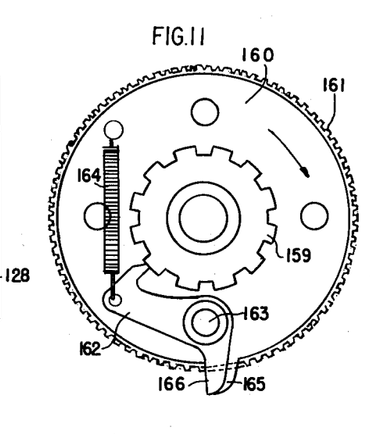

In the normal position of the shaft 158, a projection 165 on the disc 160 and a tail 166 on the pawl 162 are engaged by the armature 167 (Fig. 5) of a start magnet 168 mounted on the outside of the wall 129, at the bottom. The disc 160 is thus prevented from turning, and the nose of the pawl 162 is lifted clear of the ratchet, as shown in Figure 11. Upon the operation of start magnet 168, the armature 167 is pulled clear of the extension 165 and 166, thus releasing the pawl 162. The armature 167 at the same time releases the operating plunger of a sealed-in, snap-action contact switch 169 mounted just above it, thereby causing the closure of the motor circuit and starting the drive gear 139. The pawl 162 drops into the first one of the slots in the ratchet with which it may be or becomes aligned, following its release by the armature 167, so that the disc 160, the gear 161, and the shaft 158 begin to rotate together, in a clockwise direction as seen from the left side of the machine.

Figures 7, 8:
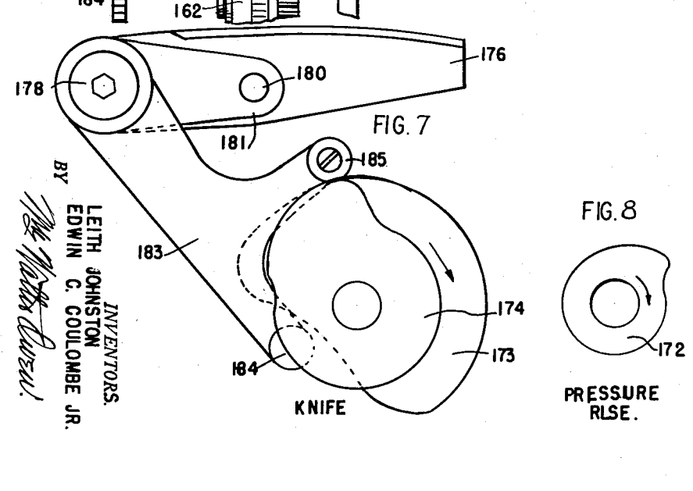
Figure 7 is an end view of the ticket cutting knife and its controlling cams.
Figures 8, 9 and 10 are similar views of the other cams on the same shaft, seen from the left, in normal position.
Figure 9:
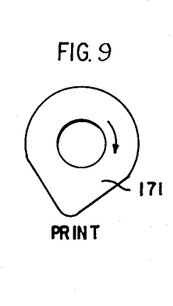
Figure 10:
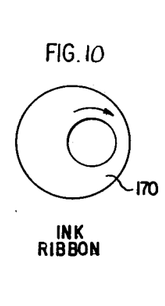

Also revolving with the shaft 158 are: an ink ribbon cam 170, shown in outline in Figure 10 in its normal position as seen from the left; a pair of print cams 171, shown in outline in Figure 9; a pressure cam 172, shown in outline in Figure 8; and a pair of knife cams 173 and 174, shown in outline by solid and dotted lines in Figure 7. The purpose of the pressure cam is to permit quick release of the printing pressure through sharp points on the print cams, in order to provide time for the feeding and cutting off of the ticket. The cam 172 does this by picking up pressure from a spring-type pressure cylinder 175 mounted nearby on the inside face of the wall 129 (Fig. 3), and then gradually releasing it to prevent back lash through the gear train.

Figures 6, 12:
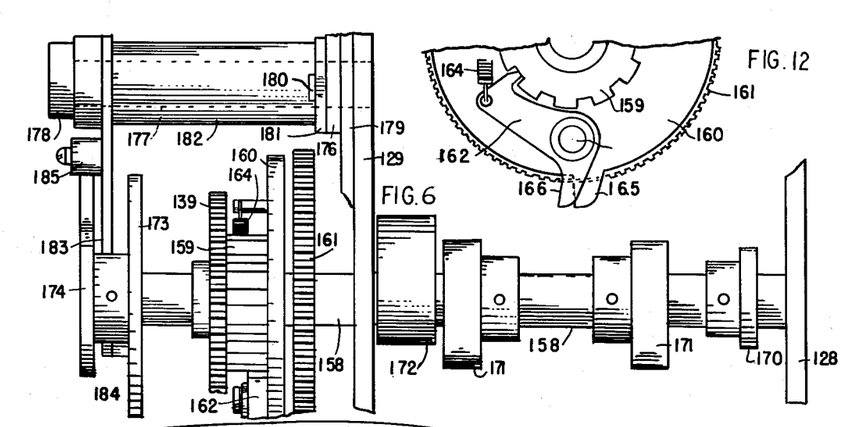
Figure 6 is a side view of the main cam shaft, which controls the printing, cutting and ink-ribbon-feed operations, seen from the front.
Figure 12 shows a portion of the same view with the pawl in the engaged or driving position, seen from the left.

The knife mechanism, shown in detail in Figures 6 and 7, consists of a knife blade 176 pivotally connected to a heavy post 177 having an enlarged head 178, and which screws into the wall 129. The knife blade 176 is riveted at 180 to an arm 181, which is rigidly secured to a sleeve 182 rotatably mounted on the post 177. Also rigidly secured to the sleeve 182, at its outer end, is a rocker arm 183 controlled by the cams 173 and 174 through cam follower rollers 184 and 185 on the arm 183. The double action of the cams 173 and 174 on the rocker arm 183, gives a positive reciprocating motion to the blade 176 which starts to move slowly downward shortly after the shaft 158 has begun its rotation, and starts back up quickly on its cutting stroke, just before the completion of rotation. A sheet metal guard 186, open at top and bottom, mounted on the outside of the wall 129 just below the knife (see Figs. 3 and 5) serves to catch most of the paper dust resulting from the cutting operation, and tends to keep it out of the gearing.

The driven gear 161, in addition to driving the shaft 158, also drives the large gear 187 (Figs. 2 and 5), which is rigidly secured to the shaft 82 rotatably mounted in bearings in the walls 128 and 129. The shaft 82 drives a bevel gear 190 mounted on its right hand end, which projects a short distance beyond the wall 128. The bevel gear 190 in turn drives a second bevel gear 191 rigidly connected to a cam shaft 192, rotatably mounted in a horizontal position across the right side of the printing unit in side brackets 193 mounted on the outer face of the wall 128.

Figure 4:
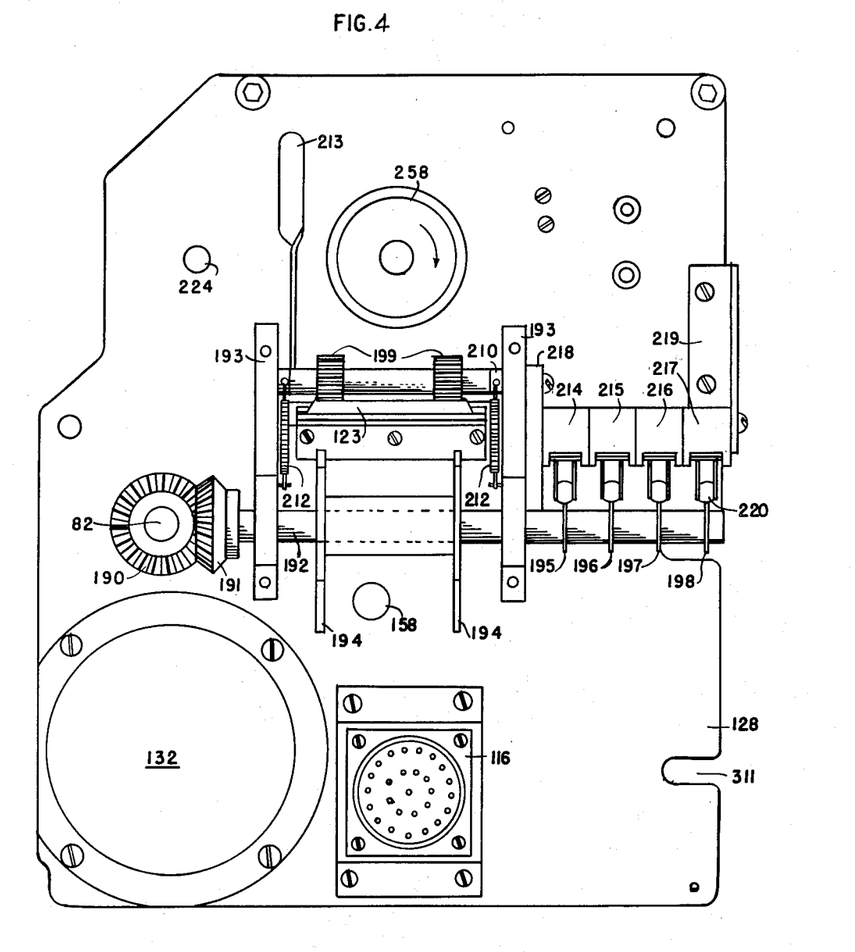
Figures 4 and 5 show right and left end views respectively, of the printing unit, Figure 4 being the paper-feeding end and Figure 5 the ticket-chute end.

Rigidly connected to the shaft 192 and thus revolving therewith are a group of cams best seen in Figure 4 and in Figures 13 to 18. These comprise: a pair of knurled paper-feed cams 194, shown in outline in normal position in Figure 14; a bet-relay-lock-up cam 195, shown in outline in Figure 15; a select-key-release cam 196, shown in outline in Figure 16; a paper-check cam 197 shown in outline in Figure 17; and a motor-circuit-lockup cam 198, shown in outline in Figure 18.

Figure 2:
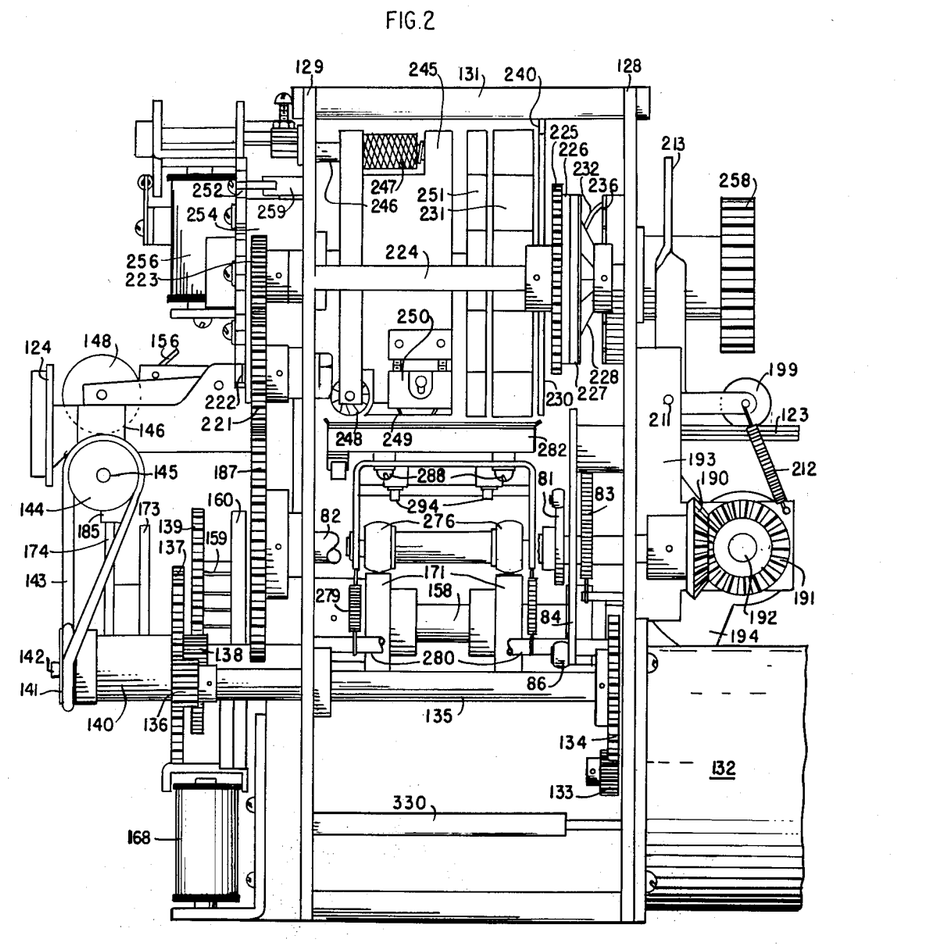
Figures 2 and 3 show front and rear elevations respectively of the printing unit, with certain parts, such as the ink ribbon reversing mechanism, omitted or broken away.

The paper feed cams 194 are mounted on the shaft just below the paper entrance chute 123 in such a way that shortly after these cams have rotated through some 190 degrees of arc, or as soon as the printing operation has been completed, the knurled wings of these cams, projecting through slots on the under side of the entrance chute, engage the paper therein, and feed it forward the length of one ticket. A corresponding downward pressure is exerted on the paper by a pair of knurled idler rollers 199 which project downward through an opening in the top of the chute. The rollers 199 are rotatably mounted on a rocking carriage 210, pivoted at 211 in the side brackets 193 (Figs. 2 and 4). The idler wheels 199, are normally held down against the paper by the tension of two coiled springs 212, while a handle 213 rigidly connected to the carriage 210, at the pivotal point thereof, permits raising the rollers 199 manually, to facilitate insertion of the paper into the entrance chute when starting a new roll. The paper is then pushed through the entrance chute into a guide on top of the printing platen until it is stopped at the wall 129 by the knife blade which normally blocks the passage into the ticket exit chute.

Just above the cams 195, 196, 197 and 198 are four sealed-in, snap-action contact switches 214, 215, 216 and 217, rigidly mounted between two brackets 218 and 219, the former secured to the right hand end bracket 193 and the latter to the wall 128. Each of these contact switches is provided with an operating lever terminating in a small roller 220, each of which rides on the associated cam for the control of a make or break contact inside the switch, the exact functions of which will be described later in connection with the circuit operation.

The gear 187, in addition to driving the shafts 82 and 192, also meshes with and drives a smaller speed changer gear 221, rotatably mounted on a short shaft 222 (Fig. 2) rigidly secured to the wall 129. The gear 221 in turn, drives a still smaller gear 223 rigidly secured to a shaft 224 rotatably mounted in suitable bearings in the walls 128 and 129. (Figs. 1 and 2.) Mounted on the right hand end of the shaft 224, just inside the wall 128, is a friction clutch, comprising a gear 225, and oiled felt disc 226, a metal disc 227, and a cup shaped spring 228 suitably compressed between two locking collars rigidly secured to the shaft by means of set screws. Thus under normal conditions, rotation of the shaft 224 will drive the gear 225. Furthermore, the gear ratios are such that while the cam shafts 158, 82, and 192 will all make one revolution for each operating cycle of the machine, the shaft 224 will make approximately 2⅓ revolutions.

Meshed with the gear 225 of the friction clutch and to the rear thereof (see Fig. 1) in the upper central portion of the printing unit, is a gear 229. Rigidly secured to the gear 229 is a toothed wheel 230 (Figs. 2 and 19) to which is rigidly secured in turn the runner-number type-wheel 231. Rigidly secured to the other side of the gear 229 but electrically insulated therefrom, is a contact brush or wiper 232 and a slip ring 233 (Fig. 1), the complete assembly being rigidly secured in turn to a sleeve 234 (Fig. 19) freely rotatable about a shaft 235 mounted in bearings in the walls 128 and 129, so that whenever the gear 229 rotates, the toothed wheel 230, the runner number type wheel, and the wiper 232, all rotate with it, in a clockwise direction. The brush 232 is arranged to wipe over a flat disc-type commutator 236 (Fig. 2) mounted on the inner face of the wall 128 around the shaft 235, and insulated from both wall and shaft. The face of the commutator is provided with 13 insulated metallic segments suitably wired to a terminal block, not shown, and the circuit to the brush is brought from an insulated terminal post 237 (Fig. 1) mounted on the wall 128, by means of a resilient metallic rod 238 which rides in a groove cut around the periphery of the slip ring 233 which is in electrical contact with the brush 232.

Figure 3:
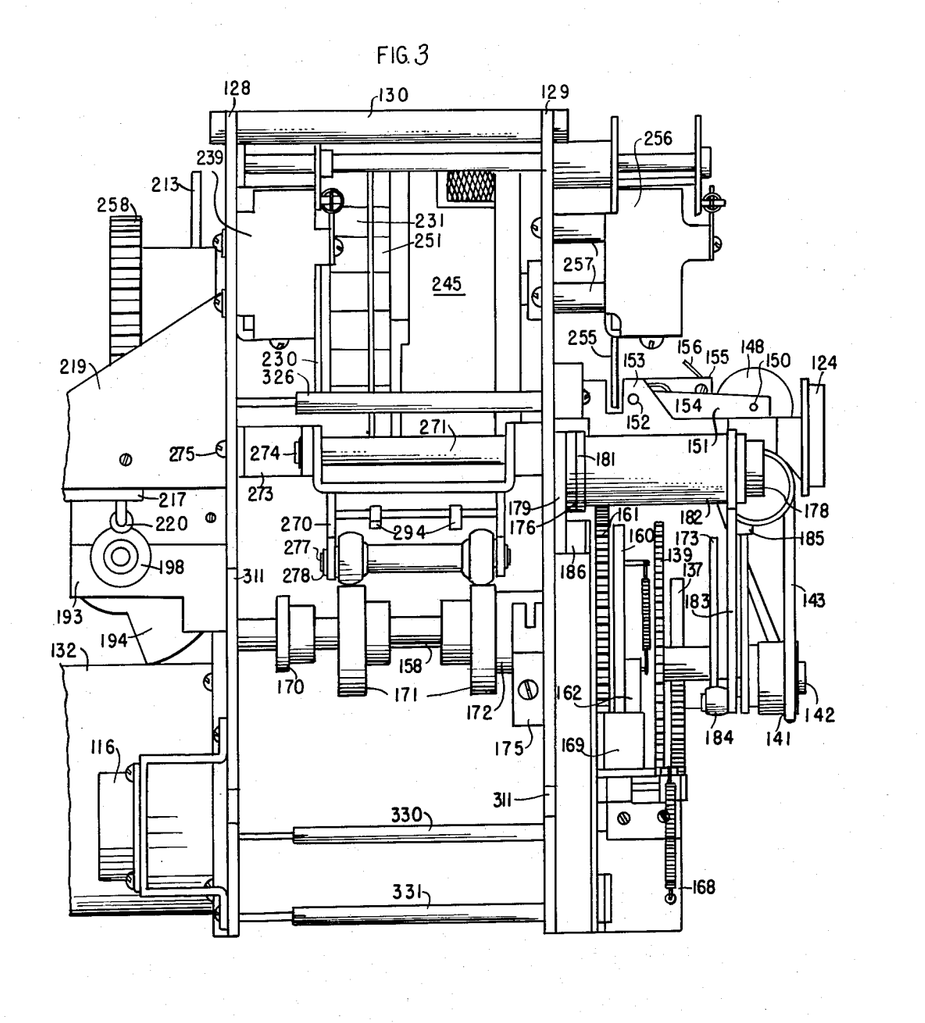
Figures 13, 14, 15, 16, 17, 18, 19:
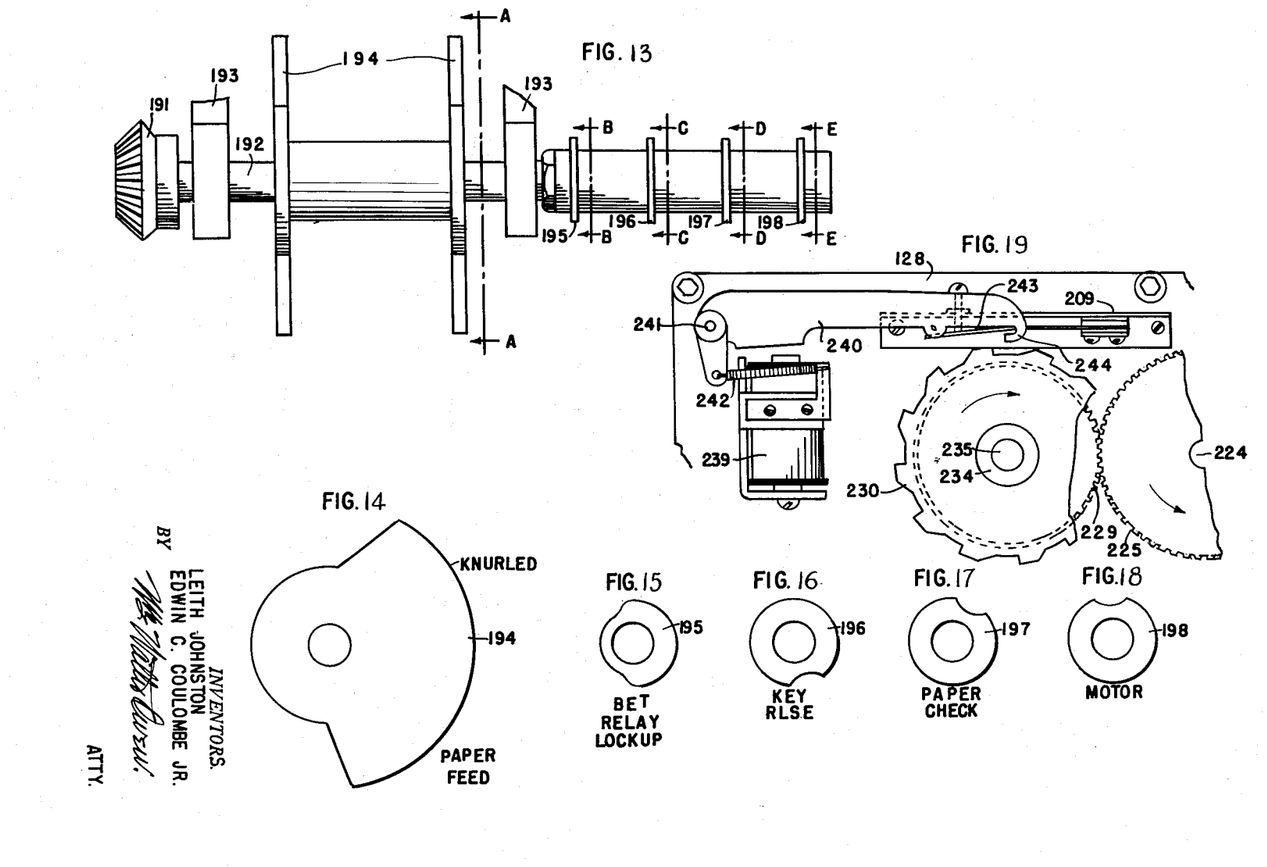

From the terminal post 237, the brush circuit goes to a stop magnet 239 mounted nearby on the inner side of the wall 128 (Figs. 1, 3 and 19). The stop magnet 239 is provided with a long armature 240 (Fig. 19) pivoted at 241, and equipped with a fixed restoring spring 242 and an adjustable restoring spring 243 mounted on an angle bracket 209 attached to the wall 128. When the brush 232 reaches a segment in the commutator marked with potential by an operated select key, the stop magnet 239 is energized, in a manner to be more fully described later in connection with the circuits, and pulls its armature 240 down against the toothed wheel 230, between two of the thirteen teeth thereon, which correspond to the thirteen type faces of the runner-number type wheel. The disc 230 continues to rotate however, until the face of the next tooth engages the inner face of the hook 244 on the end of the armature 240, when it stops, with the selected printing face of the runner wheel 231 in proper printing alignment with the printing platen. During the time that the disc 230 is thus held by the stop magnet, the gear 225 slips on its friction plate, but as soon as the printing operation has taken place, the stop magnet is released, and the gear 225 and the runner wheel assembly resume their rotation.

The printing platen, which is shown in detail in Figures 20 to 24 inclusive, as previously stated, is also shown in Figure 2 as seen from the front, with the ink ribbon removed and several cross members broken away, and in Figure 3 as seen from the rear, with the ink ribbon feed mechanism completely removed, to expose the pivoted end of the platen, which is normally concealed from view by the ink ribbon, at both front and rear.

Figure 20:
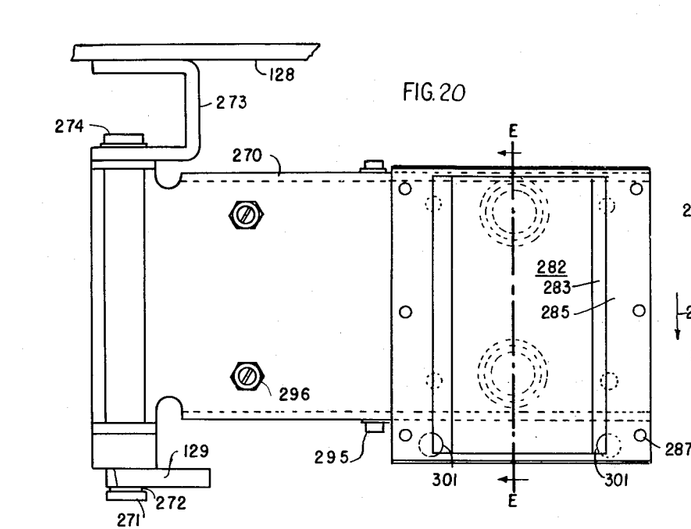
Figure 20 is a top view of the printing platen.
Figure 21:
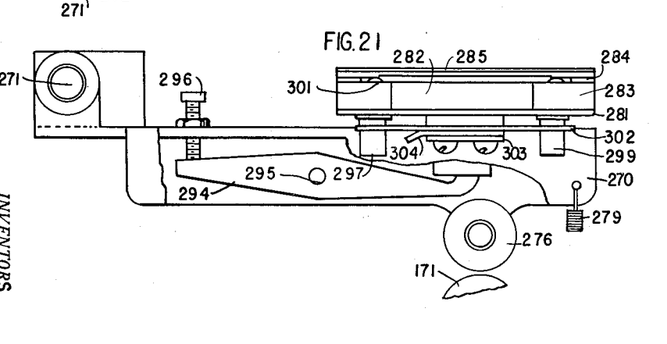
Figure 21 is a side view, seen from the left.
Figure 22:
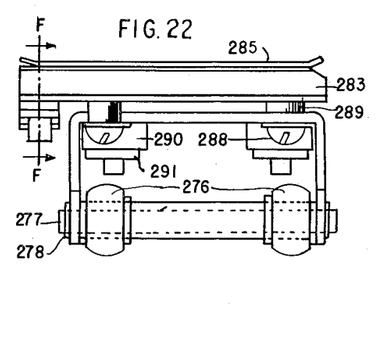
Figure 22 is an end view, as seen from the front.

As shown in Figures 20 and 21, the printing platen consists of a rocking carriage 270 pivoted about a spindle 271 secured at one end in a hole in the wall 129 by a retaining ring 272, and at the other end in a hole in a U bracket 273 by a similar retaining ring 274, the bracket 273 being rigidly attached to the wall 128 by mounting screws not shown. On the under side of the carriage 270 near the free front end, are two rollers 276 rotatably mounted on a shaft 277 secured in downturned side pieces on the carriage 270 by retaining rings 278 (Fig. 22). These rollers are normally held down against the print cams 171 by a pair of coiled springs 279, the upper ends of which are connected to the front end of the carriage 270 and the bottom ends to a rod 280 anchored in the walls 128 and 129 and shown broken off in Figure 2.

Mounted on top of the rocking carriage 270 at the free end, is the printing platen proper, consisting of a flat metallic base plate 281 carrying mounted transversely across its top, a hard rubber block 282 in the center, and two metallic blocks 283 of the same thickness, on either side thereof. Just above these and held in spaced relation therewith by thin narrow side strips 284, is a flat metallic paper guide plate 285 having the central portion cut away, and the entering and exit sides turned up as shown, the direction of feed being indicated by the arrow 286. The rubber bed plate 282 is cemented to the base plate 281, but the rest of the assembly is held together by rivets 287 along the edges. The printing platen assembly is fastened to the carriage 270 by means of four screws 288 which screw into the base plate 281 and the side blocks 283, through hollow metallic spacer tubes 289. These spacer tubes are a sliding fit in holes in the top of the carriage 270, and are provided with shoulders on the underside to limit the amount of sliding, and to hold the assemblies together.

Also mounted on the underside of the carriage 270 along the section line EE which is also the center line of the platen assembly, are a pair of metallic cylinders 290 open at both ends, and staked in place in holes in the top of the carriage. Inside each cylinder is a hollow sliding piston or plunger 291 open only at the top (Fig. 23) and containing a powerful coiled spring 292, the upper end of which engages a knob 293 riveted to the underside of the base plate 281 of the platen assembly. The pistons 291 are held in place in the cylinders 290 by a pair of levers 294 pivoted at the center on a spindle 295 anchored in the downturned sides of the carriage, and which are pressed upward against the underside of the plungers, by means of a pair of tension adjusting screws 296 mounted in the top of the carriage just above the rear end of the levers 294. It is thus seen that the platen assembly is resiliently mounted on the carriage 170 in such a way that the angle of its upper surface is self-adjustable to varying pressures of the various type surfaces, while at the same time the overall printing pressure may be changed at will, by changing the setting of the adjustment screws 296.

Figures 23, 24:
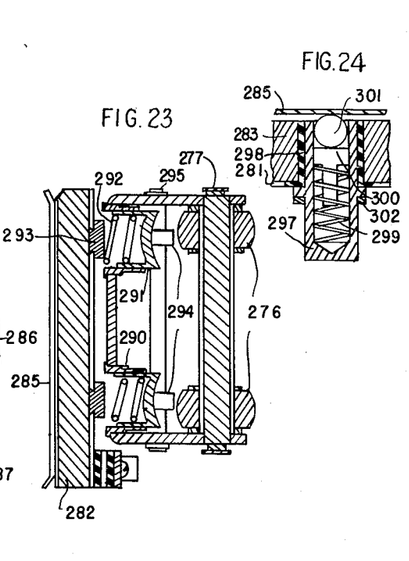
Figure 23 is a cross section view of Figure 20 taken at EE.
Figure 24 is a cross section of Figure 22 taken at FF.

Mounted on the underside of the platen assembly, near the paper exit side, are a pair of paper-check metallic cylinders 297 which pass upward through the side blocks 283 inside a non-conducting tube 298 which insulates them from the block (Fig. 24). Inside of these cylinders, which are open at the upper end, is a coiled spring 299 supporting a small metal plunger 300. The plunger 300 in turn, presses a small steel ball 301 against the underside of the edge of the paper guide 285 in the path of the ticket paper, which normally prevents contact between the two. The cylinders 297 are held in place by a cross member 302 which forms part of a terminal assembly 303 (Fig. 21) secured to the underside of the base plate 281. Holes in the ends of the cross member 302 slip over the bottom of the cylinders 297 and press upward against shoulders on the outside of the cylinders, which holds them tightly against the platen, and at the same time completes the wired side of the platen paper-check circuit leading to the terminal 304. The other side of the circuit, including the paper guide 285, is grounded to the frame of the machine.

Figure 25:
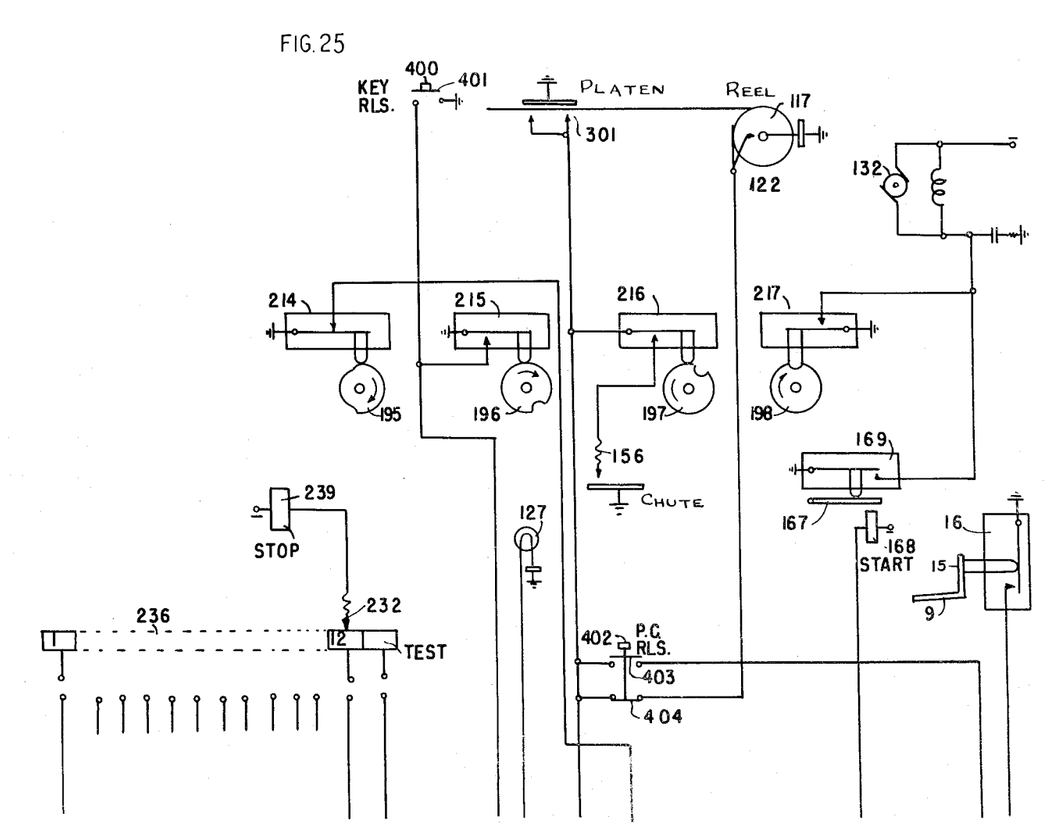
Figure 26:
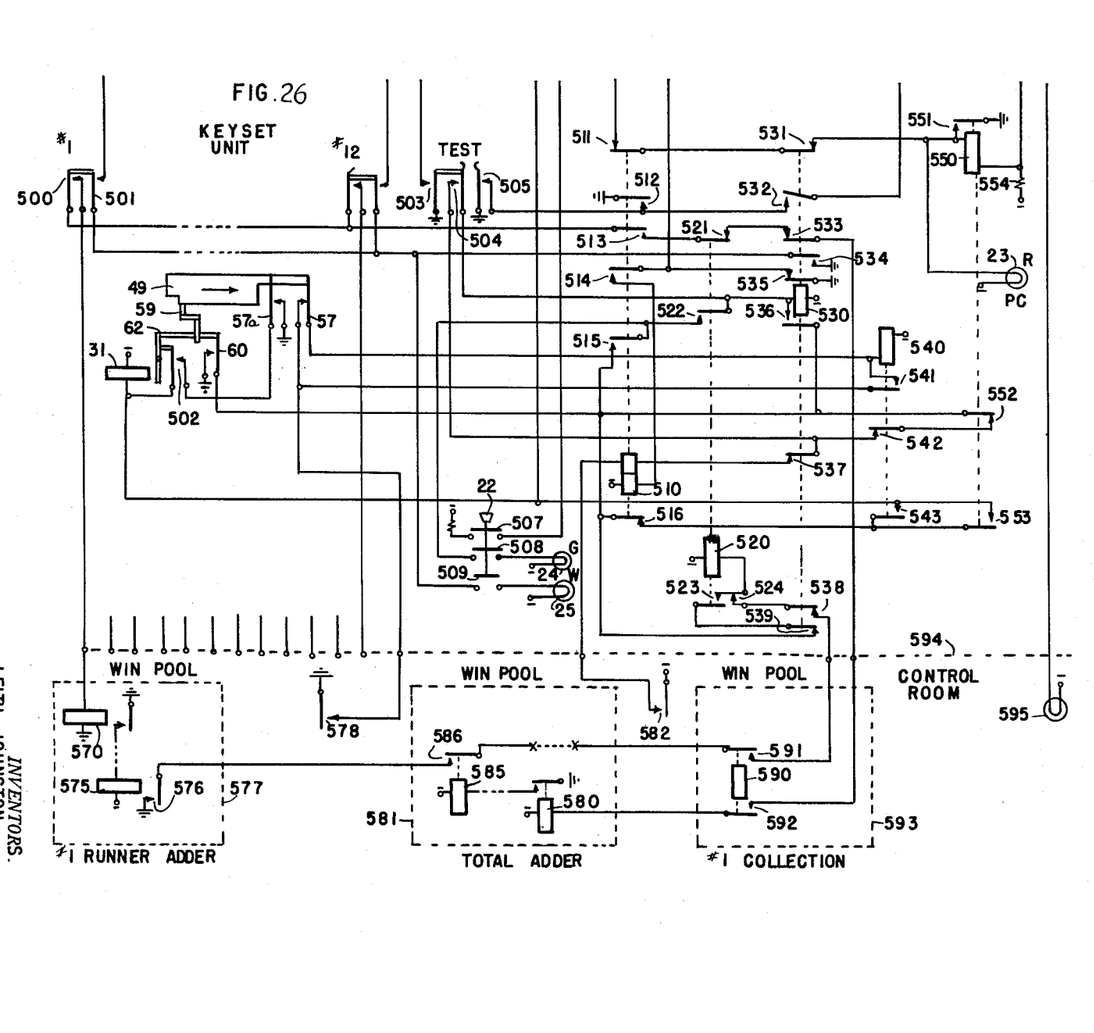
Figure 26 shows the circuit for the keyset unit, together with a portion of the totalisator control room circuits, in simplified form.

With reference to the circuit details, the complete circuit of the ticket issuing machine is shown, as previously indicated, in Figures 25 and 26, together with certain mechanical parts already described, and which have been given the same numbers as given to these parts on the mechanical drawings. Thus, Figure 25 shows the various control magnets and control cams of the printing unit, together with the commutator, the paper roll, the paper-check and cover-locking contacts, and the driving motor. Figure 26, in the upper part, shows two of the twelve runner keys, the test key, the key release magnet, the key locking bar, and the five control relays, including a "bet" relay 510 operated from the runner keys, an "acknowledgement" relay 520 operated from the totalizator in the control room, a "start" relay 530 operated by the bet and acknowledgement relays, a "lock" relay 540 operable at will from the control room, and a "paper check" relay 550. In the lower part of Figure 26, below the dotted line 594, is shown a small part of the equipment in the control room, to facilitate the understanding of the operation of the ticket issuing machine. This includes start and adder electromagnets for the #1 runner adding machine for the win pool, designated 570 and 575 respectively, start and adder electromagnets 580 and 585 in the total adder for the win pool, and a collector pickup relay 590, which serves to pick up bets from this and other designated ticket machines and pass them to the proper adders. The details of the totalisator circuits are not involved in this invention, and it will suffice to say that there is one total adder for each pool, one runner adder for each runner and each pool, and a collector for each pool.

To prepare the ticket issuing machines for operation, an authorized person in the control room closes a switch such as indicated at 582 in Figure 26, which connects negative battery to the upper winding of the bet relays of all of the ticket machines, collectively or individually, in any convenient manner, the general idea only, being shown in the drawing, however. The operation of this switch may also give a signal, in any convenient manner, that the machines are ready for operation.

If now, in the machine illustrated, the #1 runner key is operated, the key contacts 500 and 501 are closed, and the locking bar 49 is moved to the right, in the manner previously described, to open contacts 57 and close contacts 57a, which open the circuit to the lockup relay 540 and prepare a locking circuit for the key release magnet, respectively. The movement of the bar 49 also trips the bell crank 59, which causes closure of the contacts 60 associated therewith. The make contacts 502, not previously shown due to being on the rear side of the key-release magnet, are not affected, since these contacts close only when the magnet 31 is operated.

Upon the closing of break contacts 60, a circuit is closed to the bet relay 510 as follows: ground from contacts 60, through break contacts 552, 542 and 537, and the upper winding of relay 510 to supervised battery. Relay 510 operates over this circuit, and at make contacts 514 closes a locking circuit to its own lower winding, from break contacts 535 on the start relay, and from the cam controlled break contacts 214 on the printing unit. Bet relay 510 also, at make contacts 513, assuming the pickup relay in the associated collector 590 to be operated, completes a circuit for the start relays of the #1 runner adder 577 and the total adder 581 as follows: ground through start relay 570, make contacts 500 of the operated runner key, make contacts 513, break contacts 521 and 533, make contacts 592 and the winding of start relay 580 to negative battery. The start relays 570 and 580 operate in series over this circuit, and cause both the runner and total adders to pick up the amount of the ticket. This results in the operation of the electromagnets 575 and 585 in the adders which in turn close a circuit to the acknowledgement relay 520 as follows: ground from make contacts 576 in the runner adder, make contacts 586 and 591, break contacts 538 and 524, and the winding of relay 520 to battery.

The acknowledgement relay operates over this circuit, and at make contacts 523 locks direct to ground at the closed start contacts 60, contacts 524 opening at the same time, to break the original circuit to this relay. Acknowledgement relay 520 also, at break contacts 521 opens the previously traced adder start circuit, and at make contacts 522 extends the ground from contacts 60 through 515 to start relay 530. Start relay 530 thereupon operates, and at make contacts 536 locks direct to contacts 60, independently of the bet and acknowledgement relays. Start relay 530 also, at break contacts 531 opens the circuit to the paper check relay, at make contacts 532 extends ground from make contacts 512 to the start magnet 168 in the printing unit, at break contacts 533 opens another point in the adder start circuit, and at make contacts 534 grounds the #1 segment of the commutator 236, by way of make contacts 501 on the operated #1 runner key. Start relay 530 further, at break contacts 535 disconnects one of the locking grounds from the bet relay, at break contacts 537 opens the operate circuit to the bet relay now held only from contacts 214, and at break contacts 538 and 539 opens both the operate and locking circuits to acknowledgement relay 520 which immediately restores.

The start magnet 168 in the printing unit operates, upon the closure of its circuit and pulls down its armature 167, thereby tripping the printing unit's main drive clutch in the manner previously described, and at the same time closing contacts 169 to start the motor 132. Immediately after the motor starts, cam 198 closes the contacts 217 thereby closing a lockup circuit to the motor which is independent of the start contacts 169. At approximately the same time, or immediately thereafter, the cam 195 opens the contacts 214, thereby unlocking and releasing the bet relay. Bet relay 510 upon releasing, at make contacts 514 opens another point in its locking circuit, and at make contacts 512 opens the circuit to start magnet 168. The start magnet accordingly releases, opening start contacts 169, and preparing the re-engagement of the pawl and ratchet clutch previously described. This clutch has not been shown in the circuit.

The runner type wheel also starts rotating, in the manner already described, as soon as the motor starts, and drives the wiper 232 across the face of the commutator 236 which is shown extended, in symbolic form in Figure 25, rather than in its true circular shape, to facilitate drawing. Since the runner wheel has no "home" or start position, but may stop anywhere, it and the wiper 232 start from wherever they happen to be, and rotate until the wiper strikes the marked segment of the commutator, which is the #1 segment in this case. When this occurs, the stop magnet 239 in the print unit operates, from the ground at contacts 534, and stops the runner wheel, in the manner previously explained. The speed of travel of the runner wheel is such that it would make somewhat more than one complete revolution, if unimpeded, in slightly less than one half of the time required for the full operating cycle.

The printing of the ticket occurs, at approximately the mid-point of the cycle, as previously described, the actual duration of the printing pressure being only about 10 degrees of an arc on the print cams. At approximately the same time or shortly thereafter, the cam 196 in Figure 25 closes contacts 215 and causes the operation of the key release magnet 31. The armature 62 of the key release magnet thereupon pushes the bell crank lever 59 out of the way of the locking bar 49 which thereupon returns to its normal position. The armature 62 at the same time opens contacts 60 and closes contacts 502. Contacts 60 thereupon remove ground from the bet relay pull-up circuit, and unlock and release start relay 530, while contacts 502 lock up the key release magnet, from ground at contacts 57a. This latter circuit insures that the magnet 31 will remain operated until the locking bar has been completely restored to its normal position. The restoration of the locking bar of course releases the operated select key, and restores the contacts 57 and 57a to their normal position. The opening of contacts 57a unlocks the key release magnet, and since the operation of cam contacts 215 was only momentary, the magnet 31 restores and opens contacts 502. Since the locking bar is now also restored, contacts 60 remain open.

The release of the operated runner key and the start relay removes marking ground from the #1 segment of the commutator, whereupon the stop magnet 239 is released, and the runner-number type-wheel resumes rotation. If another runner key is now operated, the bet, acknowledgement, and start relays will re-operate, and again pull up the start magnet 168, so as to start the printing unit off on a new cycle, without stopping, as soon as the current cycle has been completed.

Meanwhile, the knife cams have moved the knife blade downward, out of the path of the ticket, and, as soon as the printing operation has been completed and the printing pressure released, the paper feed cams engage and advance the paper the length of one ticket, in the manner previously described. This takes about ⅓ of the operating cycle which will then be approximately ⅝ completed, and moves the printed ticket past the cutting knife and into the exit chute. As soon as the feeding operation is completed, the knife blade is moved quickly upward by its cams, and severs the printed ticket, just before the completion of the operating cycle. At approximately the same time, the cam 198 opens the motor circuit, and the motor coasts to a stop, assuming of course, that no other runner key has yet been operated. The armature 167 on the now normal start magnet 168 disengages the main clutch and stops rotation of the various cam shafts, independently of the motor, the final revolutions of which are utilized to eject the severed ticket from the exit chute, by means of the belt-driven rubber shod rollers previously described.

The printing of a test ticket requires only the operation of the test key in the keyset unit, instead of a runner key. The operation of this key is not recorded on the counters of the keyset. Neither is it registered on the adding machines in the control room, nor does it cause the operation of the bet and acknowledgement relays, as will be seen. Even should the bet relay operate however, it will not affect the operation.

Upon the operation of the test key, the locking bar 49 is moved to the right in the usual way and locks, closing contacts 60 and 57a and opening contacts 57. At the same time, make contacts 503 on the test key place a ground marking on the "Test" segment of the commutator 236, while make contacts 504 close a circuit to the start relay 530, from ground at contacts 60, through contacts 552, 542 and 504 to the relay 530. The start relay operates quickly, and at break contacts 537 disconnects the bet relay. The start relay also, at make contacts 536 locks itself operated to contacts 60, and at make contacts 532 operates the start magnet 168 from ground at make contacts 505 on the test key. The printing unit now starts and goes through its regular cycle of operations to print and issue a ticket, the only difference being that the stop magnet 239 will now stop the runner wheel when the wiper 232 reaches the test segment of the commutator, so that the word "Test" will be printed on the ticket in place of the usual runner number.

Should it be desired to lock out this machine from the control room, without affecting any other ticket issuing machine, this may be done, by operating a key such as 578 in the control room. If the keyset is normal at the time, ground from the key 578 passing through break contacts 57, causes the operation of lock relay 540. Relay 540 thereupon at make contacts 541 locks itself direct to contacts 578 independently of contacts 57, at contacts 542 opens the circuit to the bet relay to prevent its operation from contacts 60, and at make contacts 543 prepares a circuit to the key release magnet. If a key is now operated, on this machine, the locking bar 49 will be moved right as before. Now however, the ground from contacts 60, instead of operating bet relay 510 as before, to start the printing unit, passes through break contacts 516 of this relay and make contacts 543, and operates the key release magnet 31. This causes the immediate release of the key, thus making the machine, in effect, inoperative.

The paper-check relay 550, which has the same effect in preventing operation of the machine as the lock relay, may be operated from any of the three paper checks previously described, and which are all connected in parallel, as indicated in Figure 25. Thus, if the paper reel reaches the point of exhaustion, the contact 122 will receive ground through the frame of the machine and will close a circuit through break contacts 404 of the paper check release key, break contacts 511 and 531, the winding of relay 550 and the resistor 554 to negative battery. Similarly, the absence of paper in printing position in the paper guide of the printing platen, for any reason at any time, will cause the rolling ball contacts 301 to pass frame ground from the guide, direct to contacts 511 and 531 and the paper check relay. Or again, if there is no ticket under the brush 156 in the exit chute at a particular point of the feeding cycle, as determined by the setting of the cam 197 and the resultant closing of the contacts 216, or if the ticket forces the brush against the roof of the chute, in the manner previously described, the brush 156 will in turn pass frame ground to relay 550, by way of contacts 216, 511 and 531.

When the paper check relay 550 is operated, from any of these sources, the paper check lamp 23, which is connected in parallel therewith, also lights, as a warning to the operator. Relay 550, at make contacts 551 locks itself operated, at break contacts 552 opens the operate circuit to the bet relay, and at make contacts 553 prepares a circuit for the key release magnet 31, the action being similar, as stated, to that of the lock relay. One reason for providing the self-locking circuit for relay 550 is that ground is only momentarily connected to the relay from brush 156 when the trouble occurs in the exit chute, since cam 197 closes contacts 216 only briefly, and then re-opens them, as previously indicated, shortly before it completes its revolution. In the other trouble conditions, the original operating ground remains connected to relay 550 thru contacts 122 or 301.

The operator, on noting the locked condition of the machine, together with the lighted condition of the paper check lamp, will call a trouble man, although he may first if desired determine the condition of the paper reel by pressing the trouble key 22, and looking through the window in the cover, the closure of the key lighting the lamp 127 on the inside of the housing, from battery through the upper contacts 507. The trouble man will then open the machine to clear the trouble and place the machine back in service. As soon as he opens the cover, the cover locking bar 9 permits the alarm contacts 16 to close, and light the warning lamp 595 in the control room, as an indication that this particular machine is open. An audible signal may be operated also, if desired, but this feature has not been shown.

If the trouble is not immediately apparent, the source of the trouble may be determined by operating the paper check release key 402 momentarily. This key, as well as a key release key 400, is mounted on a small bracket, not shown, on the printing unit, and is thus accessible only when the cover is open. Upon the operation of the paper check release key 402, contacts 404 thereon open and contacts 403 close. Contacts 403 close a shunting circuit for relay 550 from ground at contacts 551 through contacts 531, 511 and 403 to the resistor 554 and, if the trouble is in the paper guide, from ground at contacts 301 thru contacts 403, as well. Relay 550 thereupon releases. If the stoppage was due to either the paper reel or the exit chute paper checks, the paper check lamp 23 will also be extinguished, since contacts 551, 404, and 216 will be open. And if the lamp 23 re-lights upon the release of the paper check key, the trouble is in the paper reel, since ground will be again closed to relay 550 and lamp 23 thru contacts 404, but if it remains dark, the trouble is in the exit chute, since contacts 216 are open. On the other hand, if the paper check relay 550 releases upon the operation of the key, but the lamp remains lighted, the trouble is in the paper guide in the platen, with ground fed from the contacts 301, as will be obvious. If the trouble is due to a depleted supply of paper on the reel, the trouble man may run a test ticket, or a regular ticket if necessary, from the remaining paper, by holding the key 402 operated, to keep the paper check relay de-energized, and then pressing the proper key in the keyset.

In case of other trouble, as where operation of a runner key fails to start the machine, it may be determined whether the bet and start relays have operated, either before or after the machine is opened, by pressing the trouble key 22 on the keyset unit. If the bet relay is operated at the time, ground from contacts 60 passing through make contacts 515 and contacts 508 on the trouble key will light the green bet lamp 24. And if the start relay is also operated, ground from make contacts 534 passing through contacts 509 on the trouble key will light the white start lamp 25. This permits determining quickly if the trouble is in the keyset unit or the printing unit, or possibly in the electrical connections between the two. With trouble of this nature, the trouble man may first wish to release the operated key in the keyset, which he may do, after opening the machine by operating the key-release key 400. This causes the key release magnet 31 to operate, in obvious manner.

What is claimed is:

1. In an electrically controlled ticket issuing machine operable for one complete cycle of operation responsive to the operation of any one of a plurality of select keys for printing a marking corresponding to the operated key on a ticket constituting the end portion of a supply of uncut ticket paper in said machine, relay means operated in response to said key operation for starting said machine operation, a paper guide in said machine for holding said paper in printing position, means operated responsive to said machine operation for advancing the printed ticket into the cut-off position beyond said guide and a new section of paper into printing position in said guide at the conclusion of the printing operation, an electrical circuit for said paper guide completed in case there is no paper in printing position in said paper guide, and relay means operated responsive to the completion of said circuit for disabling said first relay means.

2. In a ticket issuing machine as in claim 1, a plurality of members of a conductive material spring-pressed against one side of the paper in said paper guide to form one side of said circuit, a conducting material for said paper guide on the other side of said paper to form the other side of said circuit, and said sides of said circuit so arranged that said conductive members are pressed against the conductive material of the guide to close said circuit except when separated by said paper in printing position.

3. In a ticket issuing machine as in claim 1, a ticket ejecting chute into which the ticket is fed when advanced into the cut-off position, contacts in said chute opened by said advanced ticket and closed whenever there is no ticket in said chute, other contacts closed momentarily by said machine after said advancing operation, and a circuit completed responsive only to concurrent closure of said contacts for operating said disabling relay means.

4. A ticket issuing machine as in claim 1 including a plurality of electrical contacts in said paper guide outlining the printing position of said paper in said guide, and means whereby said paper guide circuit is completed responsive to the closure of any one of said contacts.

5. In a ticket issuing machine as in claim 2, a type wheel, means operated responsive to said machine operation for positioning said type wheel, and other means operated responsive to said machine operation for pressing said ticket against said positioned type wheel for printing said ticket, said last means including a movable printing platen on which said paper guide and said conductive members are mounted.

6. In an electrically controlled ticket issuing machine operable from any one of a plurality of select keys for printing a marking corresponding to the operated key on a ticket and for issuing said printed ticket from a supply of uncut ticket material, a start circuit completed responsive to said key operation for causing said machine to operate to thereby select and print said marking and issue said ticket, means operated responsive to said machine operation for feeding said ticket material the length of one ticket following said printing operation, an exit chute into which the printed ticket moves responsive to said feeding operation, chute contacts arranged to be closed responsive to the presence of a paper jam in said chute, chute contacts arranged to be opened responsive to the advance of said printed ticket into said chute, other contacts closed momentarily by said machine following said feeding operation, a relay, a circuit completed responsive to the closure of said other contacts while either of said chute contacts are closed for operating said relay, and means operated responsive to said relay operation for disabling said start circuit.

7. In a ticket issuing machine as in claim 6, a contact brush for said ticket chute in the path of said tickets to form one side of said circuit, fixed contacts on two sides of said brush to form the other side of said circuit, a pivoted brush carrier normally maintaining said brush in engagement with one of said contacts, and means including said brush carrier for raising said brush out of engagement with said one contact whenever a ticket is advanced into cut-off position in said chute, and for raising said brush into engagement with the other of said contacts in case of a paper jam in said chute.

8. In a ticket issuing machine operable by any one of a plurality of control keys for printing and issuing tickets carrying different markings dependent on the key operated, a roll ticket paper, a paper guide for holding said paper in printing position, an exit chute, a paper-check relay for disabling said machine, electrical circuits associated with said paper roll, said paper guide and said exit chute for operating said relay when the supply of paper on said roll becomes low, and when there is no paper in said guide, and also when there is no paper in said exit chute at a given time, a signal lamp for indicating the operation of said relay, and a push key for controlling the illumination of said lamp for indicating which of said circuits caused the operation of said relay.

9. In a ticket issuing machine, ticket printing and issuing means, means for operating said first means, control means for enabling and disabling said operating means, first supervisory means indicating one certain trouble condition for operating said control means to disable said operating means, second supervisory means indicating a different trouble condition for operating said control means independently of said first supervisory means to disable said operating means, signal means operated responsive to operation of either of said supervisory means, and means for disabling only said second supervisory means during existence of either of said trouble conditions to cause said signal means to indicate the nature of the trouble condition.

10. In a ticket issuing machine as in claim 9, means included in said means-for-disabling said second supervisory means for causing said control means to operate to re-enable said operating means.

References Cited in the file of this patent
UNITED STATES PATENTS

| | | |
|---|---|---|
| 714,790 | Elliott | Dec. 2, 1902 |
| 1,823,262 | Errera | Sept. 15, 1931 |
| 1,889,958 | Frech | Dec. 6, 1932 |
| 1,905,659 | Thomson | Apr. 25, 1933 |
| 1,916,845 | Leland | July 4, 1933 |
| 1,963,205 | Lawrence | June 19, 1934 |
| 1,968,166 | Phythian | July 31, 1934 |
| 2,026,763 | Webb | Jan. 7, 1936 |